US009012031B2

(12) United States Patent
Takagi

(10) Patent No.: US 9,012,031 B2
(45) Date of Patent: Apr. 21, 2015

(54) STEEL FUEL CONVEYING PIPE

(75) Inventor: Kazuo Takagi, Shizuoka (JP)

(73) Assignee: Usui Kokusai Sangyo Kaisha Limited (JP)

( * ) Notice: Subject to any disclaimer, the term of this patent is extended or adjusted under 35 U.S.C. 154(b) by 187 days.

(21) Appl. No.: 13/805,437

(22) PCT Filed: Jul. 5, 2011

(86) PCT No.: PCT/JP2011/065325
§ 371 (c)(1),
(2), (4) Date: Dec. 19, 2012

(87) PCT Pub. No.: WO2012/011384
PCT Pub. Date: Jan. 26, 2012

(65) Prior Publication Data
US 2013/0098496 A1    Apr. 25, 2013

(30) Foreign Application Priority Data

Jul. 23, 2010    (JP) ................................ 2010-165881

(51) Int. Cl.
F16L 9/02    (2006.01)
F02M 55/02    (2006.01)
F16L 58/08    (2006.01)

(52) U.S. Cl.
CPC  F16L 9/02 (2013.01); F02M 55/02 (2013.01); F02M 2200/05 (2013.01); F16L 58/08 (2013.01); F02M 2200/9038 (2013.01)

(58) Field of Classification Search
None
See application file for complete search history.

(56) References Cited

U.S. PATENT DOCUMENTS

| 5,246,786 | A | * | 9/1993 | Usui ............................ 428/621 |
| 5,277,228 | A | | 1/1994 | Yamanashi |
| 5,297,410 | A | * | 3/1994 | Goff ................................. 72/47 |
| 5,335,841 | A | * | 8/1994 | Yamanashi ................... 228/149 |
| 5,422,192 | A | * | 6/1995 | Takahashi et al. ............ 428/632 |
| 6,071,631 | A | | 6/2000 | Takahata |
| 6,291,083 | B1 | * | 9/2001 | Wada ............................ 428/632 |

(Continued)

FOREIGN PATENT DOCUMENTS

GB    2173424    * 10/1986
GB    2 225 591    6/1990

(Continued)

OTHER PUBLICATIONS

International Search Report of Oct. 18, 2011.

(Continued)

*Primary Examiner* — John J Zimmerman
(74) *Attorney, Agent, or Firm* — Gerald E. Hespos; Michael J. Porco; Matthew T. Hespos

(57) ABSTRACT

To provide a steel fuel conveying pipe which has high resistance to corrosive fuel and maintains reliability without damaging a direct-injection engine, and connects a high-pressure pump and a direct-injection rail with each other in a gasoline direct-injection engine system, and a fuel conveying pipe suitable as a bypass pipe for coupling direct-injection rails with each other in a V-type gasoline engine. A steel fuel conveying pipe for conveying gasoline is characterized in that a Ni-plated layer is provided on the whole inner circumferential face of the fuel conveying pipe, and an anti-rust film layer composed of a Zn-plated layer and a Zn-based alloy-plated layer is further provided on the Ni-plated layer at at least one end of the fuel conveying pipe.

9 Claims, 4 Drawing Sheets

End on the side of Fuel inflow

End on the side of Fuel outflow

(56) References Cited

U.S. PATENT DOCUMENTS

| | | |
|---|---|---|
| 7,028,668 B1 | 4/2006 | West |
| 8,596,246 B2 | 12/2013 | Nishizawa |
| 2001/0029990 A1* | 10/2001 | Takahashi et al. ............ 138/146 |
| 2005/0236060 A1* | 10/2005 | Matsubara .................... 138/143 |
| 2011/0108005 A1 | 5/2011 | Nishizawa et al. |

FOREIGN PATENT DOCUMENTS

| | | |
|---|---|---|
| JP | 2-120034 | 5/1990 |
| JP | 8-134685 | 5/1995 |
| JP | 10-121267 * | 5/1998 |
| JP | 2002-54534 | 2/2002 |
| JP | 2003-34877 | 2/2003 |
| JP | 2004-156561 | 6/2004 |
| JP | 2004-256856 | 9/2004 |
| JP | 2006-152852 | 6/2006 |
| JP | 2010-7651 | 1/2010 |
| JP | 2010007651 | 1/2010 |
| RU | 2105921 | 2/1998 |
| WO | 03/010356 | 2/2003 |

OTHER PUBLICATIONS

Russian Office Action.

* cited by examiner

End on the side of Fuel inflow

End on the side of Fuel outflow

End on the side of Fuel inflow     End on the side of Fuel outflow

End on the side of Fuel inflow     End on the side of Fuel outflow

End on the side of Fuel inflow

End on the side of Fuel outflow

End on the side of Fuel inflow

End on the side of Fuel outflow

STEEL FUEL CONVEYING PIPE

BACKGROUND OF THE INVENTION

1. Field of the Invention

The present invention relates to a pipe for supplying fuel to an engine in a gasoline direct-injection engine system.

2. Description of the Related Art

In particular, the present invention relates to a pipe having resistance to inferior fuel containing a corrosive component.

In recent years, in a gasoline direct-injection engine system whose development and release to a market have been advanced in an automobile industry for the purpose of reducing environmental load according to fuel consumption improvement, as shown in FIG. 1, a pipe 1 for supplying fuel (gasoline) to a direct-injection rail 30 of an engine (not shown) from a fuel tank 10 via a pump 20 has been demanded to have pressure resistance and air tightness higher than those of an existing multi point injection (MPI) engine (see Japanese Patent Application Laid-Open No. 2006-152852, Japanese Patent Application Laid-Open No. 2002-54534, and the like).

Further, similarly, according to advance of globalization of the automobile industry due to the rise of developing nations represented by People's Republic of China or India in addition to market expansion of alternate fuels such as represented by alcohol fuel derived from biological materials for the purpose of environmental load reduction, based upon operations of automobiles equipped with a gasoline direct-injection engine using fuel derived from biological materials or fuel (hereinafter, referred to as "corrosive fuel") containing much corrosive component containing such as water, salts, and corrosive factors (mainly, acid), which were supplied under an inferior environment, a pipe having resistance even to these inferior corrosive fuels has been demanded.

In the conveying pipe of fuel (shown by reference sign 1 in FIG. 1) used in the gasoline direct-injection engine system, products obtained by performing various plastic workings (pipe-end forming working, bending working or the like) or joining working (brazing working or the like) to a stainless material (without performing a unique surface treatment owing to corrosion-resistant performance specific to the stainless material) have been most adopted as a standard, as a specification which allows stable material supply with globalization of the automobile industries, especially, manufacturing bases and has various performances such as the above-described pressure resistance, air tightness, or corrosion resistance.

Also, steel materials which are more inexpensive than the stainless materials adopted in the existing MPI engine system normally have been adopted for specific products satisfying required performances.

However, the stainless pipe which has been subjected to plastic working or joining working includes the following problems:

Stress corrosion cracking (SCC) to salt damage specific to automobile-use environment in a cold area or a marine coast region;

Corrosion resistance to a fuel having extremely high corrosiveness due to its high concentration content of water or salts (especially, corrosive cationic ions such as chloride) and use under high-pressure and high-temperature conditions in a direct-injection system or the like; and Sensitization (rising the degree of risk of occurrence of SCC) or mechanical property lowering (lowering of strength) due to thermal influence during joining work.

Therefore, product-working conditions, materials, product specifications are limited by these problems, which results in not only increase in cost or impossibility of stable material supply due to addition of steps or requirements of high precision, but also impossibility of product realization.

Unlike such a stainless pipe, a steel pipe such as low-carbon steel has sufficiently satisfactory properties about the problems involved in the plastic working or the joining working except for the corrosion resistance. Even regarding the corrosion resistance which is only one and maximal problem, it has been known that the corrosion resistance of the steel pipe can be considerably elevated by applying anticorrosive plating having a sacrifice anti-rust mechanism of Zn series or Al series to an outer surface of the steel pipe against salt damage due to an external environment and applying anti-rust plating excellent in barrier property of Ni series, Cr series, Co series, Sn series, or the like to an inner surface of the steel pipe against corrosive fuels.

However, when only the anti-rust plating specialized in only the barrier anticorrosive mechanism is adopted against the corrosive fuels containing water or salts, it is necessary to adopt a film having a substantial film thickness (for example, a level from several tens μm to a hundred and several tens μm) or change a plurality of films to a multi-layer/complex (alloying) structure in order to completely exclude a defect such as a pinhole which may become a corrosion starting point. However, on the contrary, of course, in addition to such a point that cost increases due to the thickening of a film or the complexity, there is also such a case that breaking (cracking) or separation (delamination) of a plated film occurs due to lowering of a film strength or adhesion strength with a base material, and the barrier performance rather lowers and the corrosion resistance becomes poor so that the required performances cannot be satisfied and a product cannot be realized.

As the countermeasure to the above problem, it is thought to apply anti-rust plating having a sacrifice anticorrosion mechanism of Zn series or Al series excellent in salt damage resistance to an inner surface of the steel pipe, but occurrence of such a new problem is concerned that because the anti-rust plating has a sacrifice anticorrosion function, Zn or Al which is an anti-rust plating component is eluted in corrosive fuels as ions so that the eluted ions raise various adverse effects at various sections of an internal combustion engine.

In view of these circumstances, an object of the present invention is to provide a steel fuel conveying pipe which has a high resistance to corrosive fuel to solve such a problem, and connects a high-pressure pump and a direct-injection rail in a gasoline direct-injection engine system while maintaining reliability without impairing a function of the direct-injection engine, and a bypass pipe for coupling direct-injection rails in a V-type gasoline engine.

SUMMARY OF THE INVENTION

The present invention provides an invention of a steel pipe for gasoline having an excellent inner surface treatment in resistance to corrosive fuel where an amount of ions eluted into corrosive fuel has been remarkably reduced as a result of keen investigations about corrosion resistance, especially, an inner surface of a fuel pipe to corrosive fuel.

As a first aspect of the present invention, there is provided a steel fuel conveying pipe which conveys gasoline from a high-pressure pump to a direct-injection rail in a gasoline direct-injection engine system and a steel fuel conveying pipe which is used in a bypass pipe coupling direct-injection rails with each other in a V-type gasoline engine, characterized in that the fuel conveying pipe is configured such that a pipe inner face thereof at at least one end thereof includes an anti-rust film layer composed of a Zn-plated layer or a Zn-based alloy-plated layer, a Ni-plated layer, and a steel pipe base material formed in this order from the side of the inner surface, more specifically, the Ni-plated layer is provided on a whole inner circumferential face of the fuel conveying pipe, and the anti-rust film layer composed of the Zn-plated layer or the Zn-based alloy-plated layer is further provided on the Ni-plated layer at at least one end of the fuel conveying pipe.

Further, as a second aspect of the present invention, there is provided a steel fuel conveying pipe which conveys gasoline from a high-pressure pump to a direct-injection rail in a gasoline direct-injection engine system and a steel fuel conveying pipe which is used in a bypass pipe coupling direct-injection rails with each other in a V-type gasoline engine, characterized in that the fuel conveying pipe is configured such that a pipe inner face thereof at an end on the side of gasoline inflow includes an anti-rust film layer composed of a Zn-plated layer or a Zn-based alloy-plated layer, a Ni-plated layer, and a steel pipe base material formed in this order from the side of an inner surface of the fuel conveying pipe, more specifically, the Ni-plated layer is provided on a whole inner circumferential face of the fuel conveying pipe, and the anti-rust film layer composed of the Zn-plated layer or the Zn-based alloy-plated layer is further provided on the Ni-plated layer at the end on the side of gasoline inflow in the fuel conveying pipe.

Further, as a third aspect of the present invention, there is provided a steel fuel conveying pipe which conveys gasoline from a high-pressure pump to a direct-injection rail in a gasoline direct-injection engine system and a steel fuel conveying pipe which is used in a bypass pipe coupling direct-injection rails with each other in a V-type gasoline engine, characterized in that the fuel conveying pipe is configured such that a pipe inner face thereof at both ends on the sides of gasoline inflow and gasoline outflow includes three layers of an anti-rust film layer composed of a Zn-plated layer or a Zn-based alloy-plated layer, a Ni-plated layer, and a steel pipe base material formed in this order from the side of an inner surface of the fuel conveying pipe, more specifically, the Ni-plated layer is provided on a whole inner circumferential face of the fuel conveying pipe, and the anti-rust film layer composed of the Zn-plated layer or the Zn-based alloy-plated layer is further provided on the Ni-plated layer at the ends on the sides of gasoline inflow and gasoline outflow in the fuel conveying pipe.

As a fourth aspect of the present invention, there is provided the fuel conveying pipe according to any one of the first aspect to the third aspect, characterized in that the anti-rust film layer composed of the Zn-plated layer or the Zn-based alloy-plated layer is formed with a thickness in a range of 0.1 to 8 μm, and when an inner diameter of the fuel conveying pipe is D mm, the anti-rust film layer is provided up to a position of D to 6D mm from the end of the fuel conveying pipe inward.

Further, as a fifth aspect of the present invention, there is provided the fuel conveying pipe according to any one of the first aspect to the fourth aspect, characterized in that the Ni-plated layer is formed with a thickness in a range of 1 to 15 μm.

Further, as a sixth aspect of the present invention, there is provided the fuel conveying pipe according to any one of the first aspect to the fifth aspect, characterized in that a portion or the whole of an outer surface of the fuel conveying pipe is covered with a Zn-plated layer or a Zn-based alloy-plated layer.

Furthermore, as a seventh aspect of the present invention, there is provided the fuel conveying pipe according to any one of the first aspect to the sixth aspect, characterized in that the steel fuel conveying pipe is a fuel conveying pipe which conveys gasoline from a high-pressure pump to a direct-injection rail in a gasoline direct-injection engine system or a bypass pipe which couples direct-injection rails with each other in a V-type gasoline engine.

According to the present invention, such an industrially-significant effect can be achieved that corrosion of the inside of a fuel conveying pipe due to a corrosive factor contained in gasoline (fuel) fed from a high-pressure pump to a direct-injection rail provided with an injector under a high pressure is prevented excellently, and reliability and a life of a gasoline direct-injection engine system are significantly elevated.

DETAILED DESCRIPTION OF THE PREFERRED EMBODIMENTS

Figure 1:
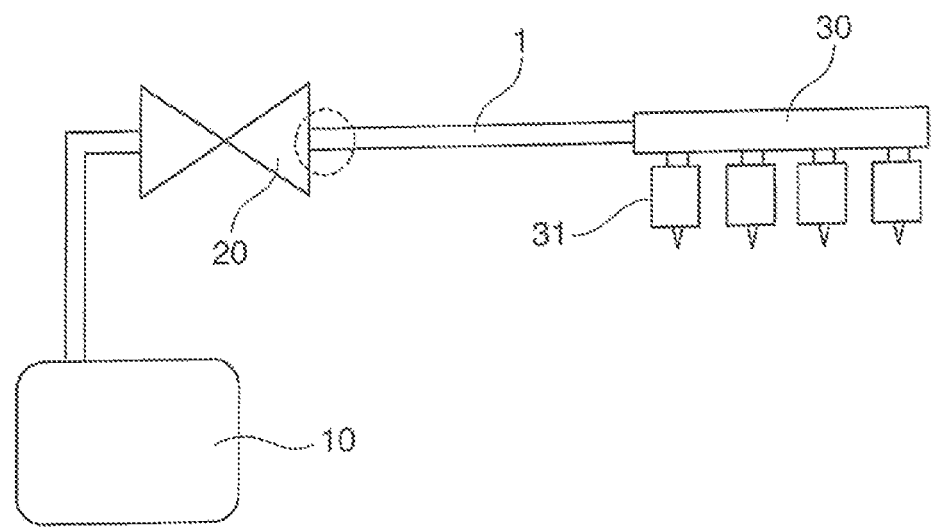
FIG. 1 is a schematic diagram showing a fuel flow passage from a fuel tank to an injector in a direct-injection engine.

The present invention has been completed based upon the following findings obtained from the result of keen investigations about corrosion resistance, especially, an inner surface of a pipe for conveying fuel to corrosive fuel:

first, in a pipe 1 for conveying fuel shown in FIG. 1, corrosion tends to occur easily, especially on the pump side of the pipe, namely, at an end on the side of fuel inflow (in a range shown by a broken-line circle in FIG. 1);

secondly, when a layer having a sacrifice anticorrosion function of such as Zn series is provided on the whole of the inner surface of a pipe, the layer is effective to corrosion but when Zn is eluted in fuel excessively, there is such a possibility that the Zn adversely affects respective sections of an engine following the pipe; and thirdly, when a layer having a sacrifice anticorrosion function of such as Zn series is provided on a specific area of an inner surface of a pipe, it is possible to prevent corrosion due to corrosive fuel over the whole inner surface of a pipe.

Examples of an embodiment of a pipe for fuel conveying according to the present invention obtained from these findings are shown in FIG. 2 to FIG. 5. These figures are illustrative sectional views showing shapes of sections of ends of pipes on the side of fuel inflow. In FIG. 2 to FIG. 5, reference sign 2 denotes a pipe base material, 3 denotes an outer anti-rust film layer composed of a Zn-plated layer or a Zn-based alloy-plated layer on an outer surface of the pipe, 3a and 3b each denote an anti-rust film layer composed of a Zn-plated layer or a Zn-based alloy-plated layer provided on a pipe inner face, L denotes a coating distance, from a pipe distal end, of the anti-rust film layer coated on the pipe inner face, 4 denotes a Ni-plated layer, and a white arrow indicates a flow direction of fuel.

Figure 2:
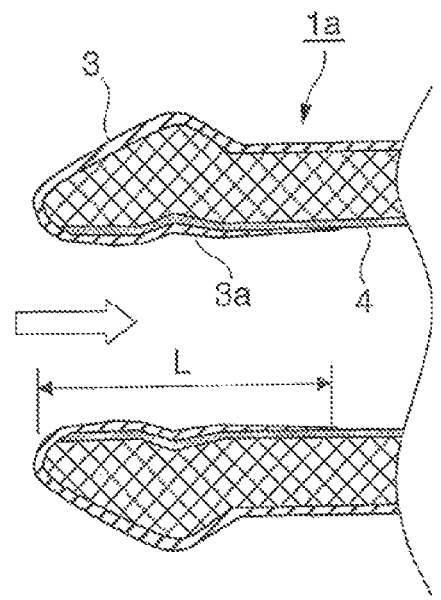
FIG. 2 is an illustrative sectional view showing a first example of a conveying pipe according to the present invention.
Figure 2:
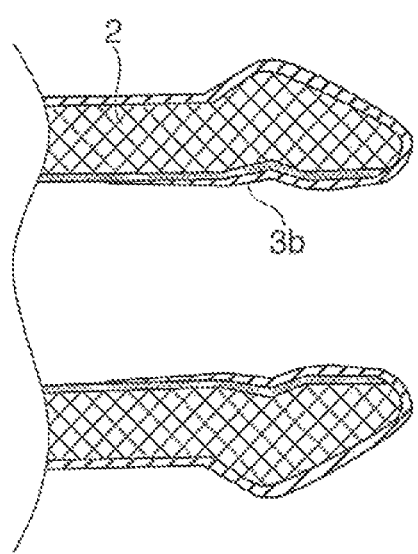
Figure 3:
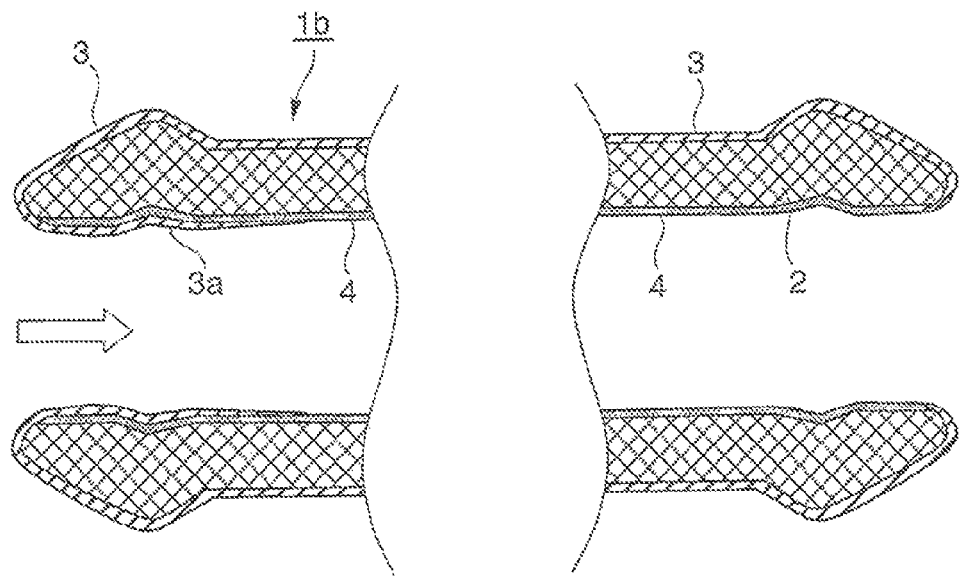
FIG. 3 is an illustrative sectional view showing a second example of a conveying pipe according to the present invention.
Figure 4:
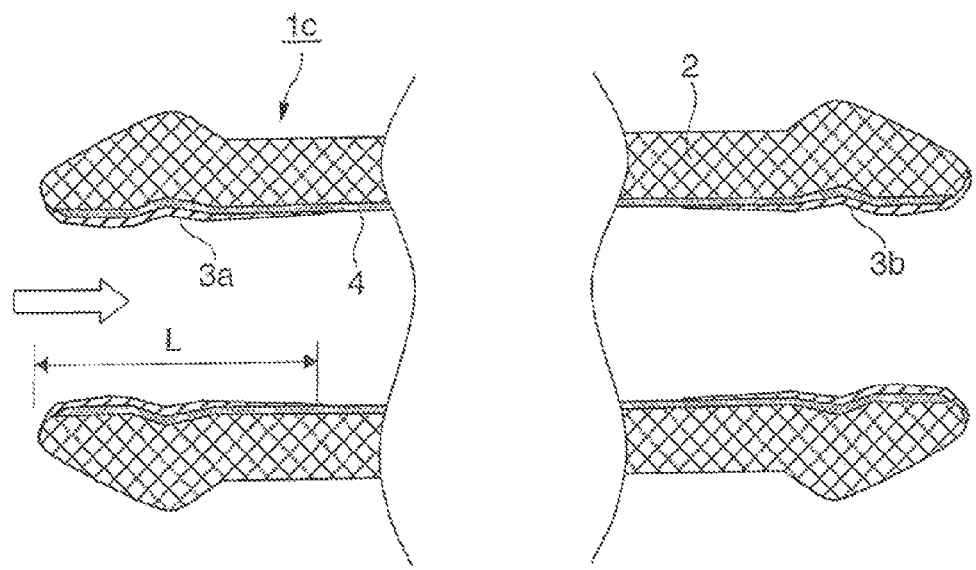
FIG. 4 is an illustrative sectional view showing a third example of a conveying pipe according to the present invention.
Figure 5:
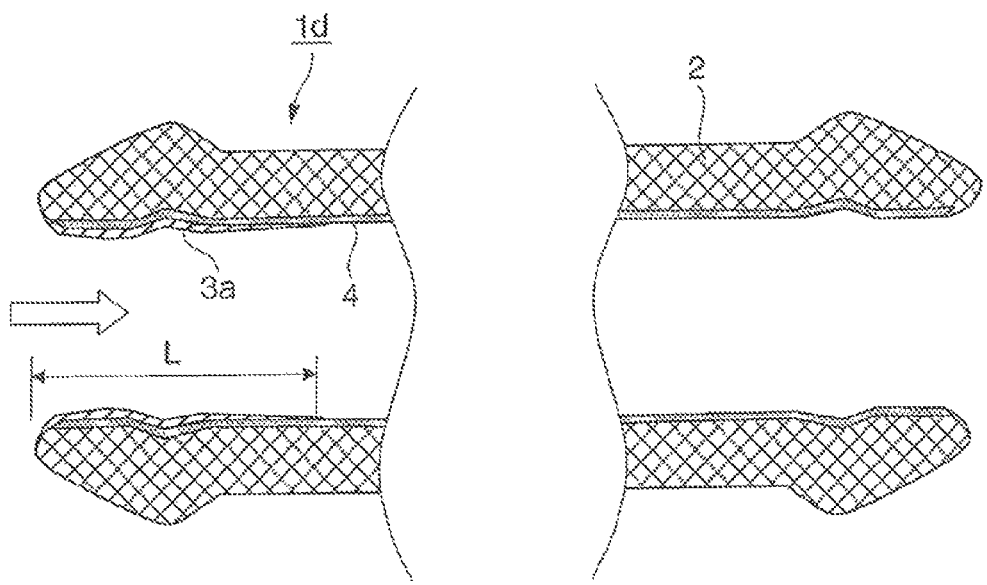
FIG. 5 is an illustrative sectional view showing a fourth example of a conveying pipe according to the present invention.

A fuel conveying pipe 1a shown in FIG. 2 is a fuel conveying pipe having an outer anti-rust film layer 3 composed of a Zn-plated layer or a Zn-based alloy-plated layer on an outer surface of the pipe and anti-rust film layers (3a and 3b) composed of a Zn-plated layer or a Zn-based alloy-plated layer on inner faces of ends on the sides of fuel inflow and fuel outflow; a fuel conveying pipe 1b shown in FIG. 3 is a fuel conveying pipe having an outer anti-rust film layer 3 composed of a Zn-plated layer or a Zn-based alloy-plated layer on an outer surface of the pipe and an anti-rust film layer 3a composed of a Zn-plated layer or a Zn-based alloy-plated layer only on an inner face of an end on the side of fuel inflow; a fuel conveying pipe 1c shown in FIG. 4 is a fuel conveying pipe having anti-rust film layers (3a and 3b) composed of a Zn-plated layer or a Zn-based alloy-plated layer only on inner faces of ends on the sides of fuel inflow and fuel outflow; and a fuel conveying pipe 1d shown in FIG. 5 is a fuel conveying pipe having a anti-rust film layer 3a composed of a Zn-plated layer or a Zn-based alloy-plated layer only on an inner face of an end on the side of fuel inflow.

The fuel conveying pipe of the present invention represented by the fuel conveying pipes 1a to 1d shown in FIG. 2 to FIG. 5 is configured, in an inner face of the pipe provided with a Ni-plated layer 4, to have the anti-rust film layer 3a composed of the Zn-plated layer or the Zn-based alloy-plated layer formed on the Ni-plated layer 4 from the pipe distal end, in particular, an end on the side of fuel inflow (an end positioned on the side of the high-pressure pump 20 in FIG. 1) up to a position of a distance L (mm) toward a flow direction of fuel (a center direction of a direct-injection rail). Similarly, the anti-rust film layer 3b composed of the Zn-plated layer or the Zn-based alloy-plated layer may be also provided on an end on the side of fuel outflow.

The present invention is characterized in that pipe corrosion due to corrosive fuel containing much corrosive factor such as water, salts or acid is prevented by applying the anti-rust layer (3a, 3b) composed of the Zn-plated layer or the Zn-based alloy-plated layer to a surface of the Ni-plated layer 4 from the pipe end on the fuel inflow side up to a proper distance (the distance shown by the reference sign L defined in the present invention).

The details of the corrosion-preventing effect are not clear yet, but they are considered in the following manner.

Zn ions which are eluted from the anti-rust film layer composed of the Zn-plated layer or the Zn-based alloy-plated layer and provided on a pipe inner face of a fuel conveying pipe having an inner diameter of at most about 8 mm neutralize corrosive factor components (salts or the like) in corrosive fuel to inhibit corrosiveness of the fuel, so that corrosion of a pipe material can be prevented in not only a portion of the inner surface of the pipe coated with the anti-rust film layer but also an area covered with only the Ni-plated layer in the fuel conveying pipe.

In this case, by applying the anti-rustn film layer composed of the Zn-plated layer or the Zn-based alloy-plated layer to a pipe end portion serving as a liquid flow inlet (on the side of fuel inflow) for corrosive fuel, the corrosive fuel is first brought into contact with the anti-rust film layer necessarily and Zn ions are eluted to neutralize corrosive factors, so that corrosion of an area of the inner surface of the pipe covered with only the Ni-plated layer can be prevented further securely.

Further, corrosiveness of corrosive fuel is relaxed in the case of a closed pipe inside by only occurrence of a sacrifice anticorrosion reaction of the anti-rust film layer to corrosive fuel. Therefore, as a result, corrosion of the pipe material can be prevented even in an area covered with only the Ni-plated layer. In this case, by providing the anti-rust film layer at the pipe end portion serving as the liquid flow inlet for corrosive fuel, the corrosive fuel is first brought into contact with the anti-rust film layer necessarily, which causes the sacrifice anticorrosion reaction, so that corrosion of the area of the pipe inner surface covered with only the Ni-plated layer can be prevented further securely.

Next, limitation reasons of respective elements will be described.

[Anti-Rust Film Layer Composed of a Zn-Plated Layer or a Zn-Based Alloy-Plated Layer on an Inner Face of a Pipe]

As the anti-rust film layer provided on the inner face of the pipe, an Zn-plated layer or an Zn-based alloy-plated layer of Zn—Ni alloy, Zn—Sn alloy, or the like is provided.

Formation of the Zn-plated layer or the Zn-based alloy-plated layer can be performed by a method for electroplating the layer on a pipe inner face directly, a method for forming a Zn-plated layer according to involving the Zn-plated layer into an inner face of the pipe at a formation time of the Zn-plated layer on an outer surface of the pipe in such a case that the Zn-plated layer is provided on the outer surface of the pipe, or the like, but any method can be adopted if the method satisfies the condition (coating distance L) of the Zn-plated layer or the Zn-based alloy-plated layer which corresponds to the anti-rust film layer provided on the inner face of the pipe and defined in this invention.

Also, it is preferred that an elution amount of Zn ions eluted from the anti-rust film layer (Zn-plated layer, the Zn-based alloy-plated layer) to gasoline fuel (corrosive fuel) in the fuel conveying pipe is less than 1 ppm. This is because when the elution amount of Zn ions is less than 1 ppm, various adverse effects are not caused to at least respective sections of an internal combustion engine. However, if a plating amount of the Zn-plated layer is excessively low (that is, the elution amount of Zn ions is less than 0.1 ppm), rust-prevention (ability for inhibiting neutralization of corrosive fuel) is inversely lowered, which is undesirable.

Figure 6:
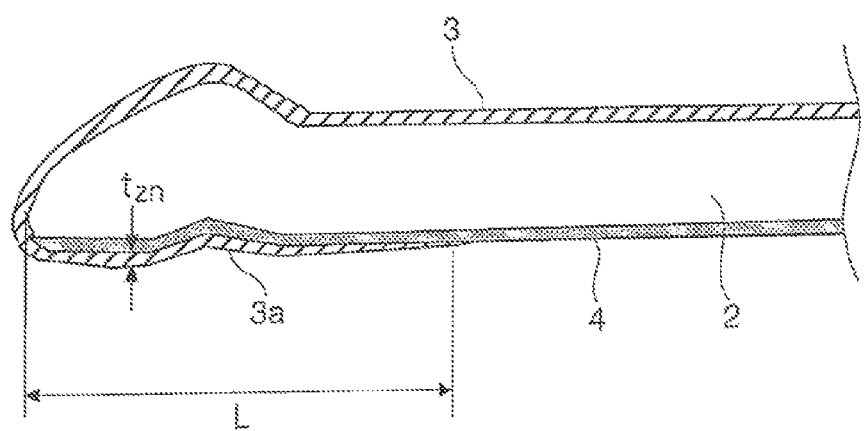
FIG. 6 is a partially-enlarged sectional view of an end on the side of fuel inflow in a fuel conveying pipe according to the present invention.

FIG. 6 shows an aspect of an anti-rust film layer composed of a Zn-plated layer or a Zn-based alloy-plated layer on an inner face of the pipe. FIG. 6 is a partially-enlarged sectional view of an end on the side of fuel inflow of a fuel conveying pipe according to the present invention.

It is desirable that when an inner diameter of the pipe is D mm, the anti-rust film layer 3a is provided such that the coating distance L of the anti-rust film layer 3a on the inner face of the pipe from the pipe distal end reaches a position of D to 6D mm.

Further, as shown in FIG. 6, it is desirable that a layer thickness tzn of the anti-rust film layer 3a is provided to have a thickness of 0.1 to 8 μm.

Also, the anti-rust film layer 3b at the end on the side of fuel outflow is provided under the conditions similar to the above.

[Outer Anti-Rust Film Layer Composed of a Zn-Plated Layer or a Zn-Based Alloy-Plated Layer]

The outer anti-rust film layer 3 provided on an outer surface of a portion or the whole of the fuel conveying pipe serves to prevent corrosion of the pipe due to an external corrosion factor and is formed with a thickness of 3 to 25 μm, preferably a thickness of 5 to 13 μm, by an electroplating method or the like. In the case of a fuel conveying pipe having a specification of providing the outer anti-rust film layer 3 on an outer surface of the pipe, the anti-rust film layer(s) (3a, 3b) covering an inner face having a predetermined form may be provided simultaneously when the outer anti-rust film layer 3 is provided on the outer surface.

[Ni-Plated Layer]

The Ni-plated layer 4 is provided at a position directly contacting with an inner face of the pipe base material 2 of the fuel conveying pipe, for example, by such a method as an electroplating method or a non-electrolytic plating (chemical plating), so that the Ni-plated layer 4 serves as a barrier for covering the inner face of the pipe base material 2 to break contact between corrosive fuel and the pipe base material. Here, after formation of the Ni-plated layer, heat treatment may be appropriately performed in order to produce a diffusion layer to elevate adhesion with the pipe base material.

The thickness of the Ni-plated layer 4 is preferably in a range of 1 to 15 μm (if there is a diffusion layer of the Ni-plated layer, the thickness in the range of 1 to 15 μm also includes the thickness of the diffusion layer of the Ni-plated layer), more preferably in a range of 3 to 9 μm (if there is a diffusion layer of the Ni-plated layer, the thickness in the range of 3 to 9 μm also includes the thickness of the diffusion layer of the Ni-plated layer). This is because when the thickness of the Ni-plated layer 4 is less than 1 μm, a barrier function to attack of corrosion from corrosive fuel to the pipe base material does not serve sufficiently. Further, when the thickness exceeds 9 μm, the degree of the effect becomes to slow down, and when the thickness exceeds 15 μm, improvement of the effect corresponding to increase of manufacturing cost cannot be obtained and besides cracking (breaking) becomes easy to occur in the plated film when plastic working of the pipe (for example, bending working) is performed, so that a problem of lowering of the barrier function rather occurs. Further, the Ni-plating may be applied to the outer face (the whole) of the pipe.

[Pipe Base Material]

As the pipe base material 2 used in the fuel conveying pipe of the present invention, seamless pipe made of steel and having pressure resistance which can withstand high pressure of fuel pressure-fed is suitable.

[Corrosive Fuel]

The fuel conveying pipe according to the present invention can obtain more effective function and effect in use for "corrosive fuel" than use for "high-quality fuel" commercially available in Japan.

In other words, the fuel conveying pipe of the present invention is effective especially to such as gasoline containing much corrosive factor manufactured and supplied under a poor environment when fuel which has been mixed with such as "chloride ions", "water" being impurity is used because alcohol contained in an alcohol-mixed fuel derived from biological material and tending to change to corrosive fuel is derived from the biological material, namely, chemical synthesis or when gasoline containing degraded gasoline where acid such as formic acid or acetic acid which becomes a corrosive factor has occurred due to advance of oxidation according to a long period staying is used.

More specifically, the fuel conveying pipe of the present invention has a significant effect to corrosive fuel rich in corrosiveness such as a fuel containing 100 to 1000 ppm or more of organic acid (formic acid or acetic acid), 1 to 10% or more of water, or 1 to 100 ppm or more of chloride.

EXAMPLES

The present invention will be described below in detail based upon examples.

In the examples, an effect of an anti-rust film layer which was applied to an inner face of a pipe was determined by performing corrosion test to corrosive fuel and observing a corrosion situation (corrosion resistance) visually and using a microscope. Further, components of test liquid after corrosion test were analyzed and an elution amount of Zn was measured in order to determine the degree of Zn elution from an anti-rust film layer composed of a Zn-plated layer or a Zn-based alloy-plated layer.

Further, adhesion of a plated layer in the pipe was evaluated by performing a JASO-M-101 compliant bending test. A case where delaminating or cracking occurred was marked with a sign "X".

[Forming Method of an Anti-Rust Film Layer on an Inner Face and an Outer Anti-Rust Film Layer]

1. Zn-Plated Layer

Using a commercially-available zincate bath (manufactured by JASCO International Co., Ltd.), electrodeposition plating was applied to an outer surface of a pipe with a current density of 3 A/dm$^2$, while electrodepositon to an inner face of the pipe was performed over a range of a desired coating distance (L) by using a false anode of a wire made of steel. When an outer surface and an inner face are applied with different kinds of film layers, the respective surface and face are individually plated, and in so doing, they may be plated so as not to be affected to each other, while being masked.

2. Zn-Based Alloy-Plated Layer/Zn—Ni Alloy-Plated Layer

Using a commercially-available alkaline bath (manufactured by JASCO International Co., Ltd.), electrodeposition plating was applied to an outer surface of a pipe with a current density of 5 A/dm$^2$, while electrodepositon to an inner face of the pipe was performed over a range of a desired coating distance (L) by using a false anode of a wire made of nickel.

3. Zn-Based Alloy-Plated Layer/Sn—Zn Alloy-Plated Layer

Using a commercially-available neutral bath (manufactured by DIPSOL CHEMICALS CO., LTD.), electrodeposition plating was applied to an outer surface of a pipe with a current density of 2 A/dm2, while electrodepositon to an inner face of the pipe was performed over a range of a desired coating distance (L) by using a false anode of a wire made of stainless.

[Forming Method of a Ni-Plated Layer]

1. Electroplating of Ni

Using a commercially-available acid bath (watt bath) and an anode of a wire made of nickel, electrodeposition plating was performed on the whole of an inner face of the pipe with a current density of 3 A/dm2.

2. Non-Electrolytic Plating of NiP (Use in Only Example 3)

Using a commercially-available acid bath (Japan Kanigen Co., Ltd.), chemical plating was performed to the whole of an inner face of the pipe with a bath temperature of 90 to 95° C.

[Items of Corrosion Test]

Test Liquid; corrosive fuel
  20% of fuel mixed with alcohol (gasoline) containing 500 ppm of organic acid (formic acid and acetic acid), 5% of water, and 10 ppm of chloride
Test Method
  Corroded conditions inside a pipe obtained by sealing test fuel in the pipe and leaving the pipe under the following conditions, and further, the sealed test fuel was sampled and a component analysis of the sampled test fuel was performed (after water was extracted, concentration of free Zn ions was measured).

Test Temperature: 100° C.
Test Time: 1000 hours (the test liquid was replaced by fresh test liquid for each 100 hours.)
Corrosion Evaluation: Visual observation about presence/absence of rust Example 1

In the fuel conveying pipe 1a of the present invention having the structure shown in FIG. 2, a steel pipe for high pressure having an inner diameter of 5 mm (D=5 mm) was used as the pipe base material 2, the Ni-plated layer 4 was formed by applying Ni plating with a thickness of 10 μm to the whole inner face of the pipe material, and the anti-rust film layers 3a and 3b were then formed by setting a Zn-plated layer as the anti-rust film layer from an end of the pipe, setting the coating distance L of the anti-rust film layer to 10 mm (L=2D=10 mm) and applying Zn plating with a thickness of 0.1 to 8 μm up to the position of the coating distance L, so that a test material of the fuel conveying pipe was manufactured. The corrosion test to corrosive fuel was performed using the test material. The result of the test is shown in Table 1.

Example 2

In the fuel conveying pipe 1a of the present invention having the structure shown in FIG. 2, a steel pipe for high pressure having an inner diameter of 8 mm (D=8 mm) was used as the pipe base material 2, the Ni-plated layer 4 was formed by applying Ni plating with a thickness of 10 μm to the whole inner face of the pipe material, and the anti-rust film layers 3a and 3b were then formed by setting a Zn—Ni layer as the anti-rust film layer from an end of the pipe, setting the coating distance L of the anti-rust film layer to 24 mm (L=3D=24 mm) and applying Zn—Ni alloy-plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Example 3

In the fuel conveying pipe 1a of the present invention having the structure shown in FIG. 2, a steel pipe for high pressure having an inner diameter of 3 mm (D=3 mm) was used as the pipe base material 2, a Ni-plated layer with a thickness of 5 μm was provided by non-electrolytic plating of NiP, and the anti-rust film layers 3a and 3b were then formed by setting a Sn—Zn alloy-plated layer as the anti-rust film layer on the inner face, setting the coating distance L of the anti-rust film layer to 9 mm (L=3D=9 mm) and applying Sn—Zn alloy plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Example 4

In the fuel conveying pipe 1a of the present invention having the structure shown in FIG. 2, a steel pipe for high pressure having an inner diameter of 8 mm (D=8 mm) was used as the pipe base material 2, the Ni-plated layer 4 was formed by applying Ni plating with a thickness of 15 μm to the whole inner face of the pipe material, and the anti-rust film layers 3a and 3b were then formed by setting a Zn-plated layer as the anti-rust film layer from an end of the pipe, setting the coating distance L of the anti-rust film layer to 8 mm (L=1D=8 mm) and applying Zn plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Example 5

In the fuel conveying pipe 1a of the present invention having the structure shown in FIG. 2, a steel pipe for high pressure having an inner diameter of 5 mm (D=5 mm) was used as the pipe base material 2, the Ni-plated layer 4 was formed by applying Ni plating with a thickness of 5 μm to the whole inner face of the pipe material, and the anti-rust film layers 3a and 3b were then formed by setting a Zn-plated layer as the anti-rust film layer from an end of the pipe, setting the coating distance L of the anti-rust film layer to 30 mm (L=6D=30 mm) and applying Zn plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Comparative Example 1

In the fuel conveying pipe 1a of the present invention having the structure shown in FIG. 2, a steel pipe for high pressure having an inner diameter of 8 mm (D=8 mm) was used as the pipe base material 2, the Ni-plated layer 4 was formed by applying Ni plating with a thickness of 5 μm to the whole inner face of the pipe material, and the anti-rust film layers 3a and 3b were then formed by setting a Zn-plated layer as the anti-rust film layer from an end of the pipe, setting the coating distance L of the anti-rust film layer to 80 mm (L=10D=80 mm) and applying Zn plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Comparative Example 2

In the fuel conveying pipe 1a of the present invention having the structure shown in FIG. 2, a steel pipe for high pressure having an inner diameter of 3 mm (D=3 mm) was used as the pipe base material 2, the Ni-plated layer 4 was formed by applying Ni plating with a thickness of 20 μm to the whole inner face of the pipe material, and the anti-rust film layers 3a and 3b were then formed by setting a Zn—Ni alloy-plated layer as the anti-rust film layer from an end of the pipe, setting the coating distance L of the anti-rust film layer to 12 mm (L=4D=12 mm) and applying Zn—Ni alloy plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Comparative Example 3

In the fuel conveying pipe 1a of the present invention having the structure shown in FIG. 2, a steel pipe for high pressure having an inner diameter of 8 mm (D=8 mm) was used as the pipe base material 2, the Ni-plated layer 4 was formed by applying Ni plating with a thickness of 5 μm to the whole inner face of the pipe material, and the anti-rust film layers 3a and 3b were then formed by setting a Sn—Zn alloy-plated layer as the anti-rust film layer from an end of the pipe, setting the coating distance L of the anti-rust film layer to 4 mm (L=0.5D=4 mm) and applying Sn—Zn alloy plating with a thickness of 0.1 to 8 μm up to the position of the coating distance L, so that a test material of the fuel conveying pipe was manufactured. The corrosion test to corrosive fuel which was the test liquid was performed using the test material. The result of the test is shown in Table 1.

Comparative Example 4

Figure 7:
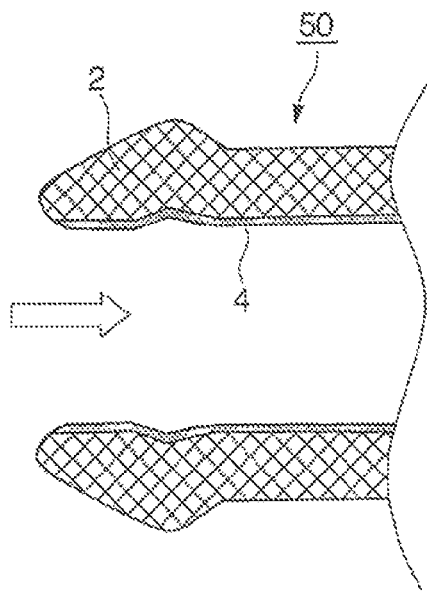
FIG. 7 is an illustrative sectional view showing a conventional fuel conveying pipe.
Figure 7:
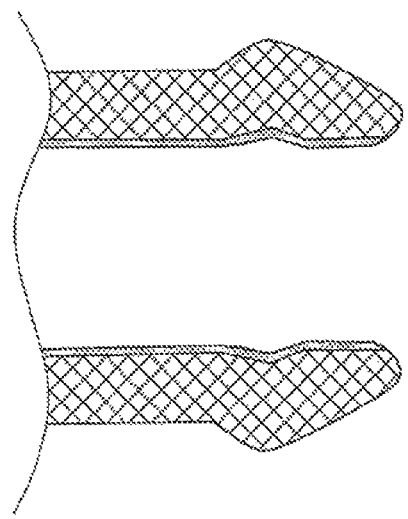

In a conventional fuel conveying pipe 50 having the structure shown in FIG. 7, a steel pipe for high pressure was used as the pipe base material 2, and the Ni-plated layer 4 was formed by applying Ni plating with a thickness of 5 μm to the whole inner face of the pipe material, so that a test material of the fuel conveying pipe was manufactured. The corrosion test to corrosive fuel which was the test liquid was performed using the test material. The result of the test is shown in Table 1.

Comparative Example 5

A test material of the fuel conveying pipe was manufactured by using a pipe material made of SUS304 as the pipe base material. The corrosion test to corrosive fuel which was the test liquid was performed using the test material. The result of the test is shown in Table 1.

As obvious from Table 1, it is understood that both adhesiveness and corrosion resistance are excellent and an elution amount of Zn ions in test fuel is less than 1 ppm in Examples 1 to where both the thickness of the Ni-plated layer and the coating distance of the anti-rust film layer fall under the scope of the present invention.

However, in Comparative Example 1 where the coating distance of the anti-rust film layer is excessively long, the elution amount of Zn ions increases up to 2.8 ppm so that it is thought that an adverse effect is easily caused at respective portions of the internal combustion engine. On the other hand, in Comparative Example 3 where the coating distance of the anti-rust film layer is short, the elution amount of Zn ions is insufficient, so that it is understood that the corrosion resistance is deteriorated.

Further, in Comparative Example 2 where the value of the thickness of the Ni-plated layer is large, it is understood that the adhesiveness is poor. Furthermore, in Comparative Example 4 where the anti-rust film layer is not provided, and in Comparative Example 5 of the fuel conveying pipe using the pipe material made of SUS304, the corrosion resistance is poor, respectively.

The invention claimed is:

1. A steel fuel conveying pipe for conveying gasoline, the pipe having opposite inner and outer circumferential surfaces and opposite ends, the pipe further comprising:
   a Ni-plated layer with a thickness of 1 to 15 μm provided on all of the inner circumferential surface of the fuel conveying pipe,
   an anti-rust film layer consisting essentially of a Zn-plated layer or a Zn-based alloy-plated layer provided on the Ni-plated layer at least at one end of the fuel conveying pipe, the anti-rust film layer having a thickness in a range of 0.1 to 8 μm, and when an inner diameter of the fuel conveying pipe is D mm, the anti-rust film layer being provided only up to a position of D to 6D mm from the end of the fuel conveying pipe inward, and
   at least a portion of the outer circumferential surface of the fuel conveying pipe being covered with a Zn-plated layer or a Zn-based alloy-plated layer.

2. A steel fuel conveying pipe for conveying gasoline, the pipe having opposite inner and outer circumferential surfaces and opposite ends, the pipe further comprising:
   a Ni-plated layer with a thickness of 1 to 15 μm provided on all of the inner circumferential surface of the fuel conveying pipe,
   an anti-rust film layer consisting essentially of a Zn-plated layer or a Zn-based alloy-plated layer provided on the

TABLE 1

| | Sample | | | | | Evaluation | | |
| --- | --- | --- | --- | --- | --- | --- | --- | --- |
| | Material | Inner Diameter D [mm] | Ni-plated layer thickness [μm] | Kind of Anti-rust film layer | Coating distance L [mm] of Anti-rust film layer | Adhesiveness *1 | Corrosion Resistance | Elution amount of Zn ions *2 |
| Example 1 | steel | 5 | 10 | Zn | 10 (2 D) | ○ | ○ | 0.3 ppm |
| Example 2 | steel | 8 | 10 | Zn—Ni | 24 (3 D) | ○ | ○ | 0.5 ppm |
| Example 3 | steel | 3 | 5 | Sn—Zn | 9 (3 D) | ○ | ○ | 0.3 ppm |
| Example 4 | steel | 8 | 15 | Zn | 8 (1 D) | ○ | ○ | 0.2 ppm |
| Example 5 | steel | 5 | 5 | Zn | 30 (6 D) | ○ | ○ | 0.9 ppm |
| Comparative Example 1 | steel | 8 | 5 | Zn | 80 (10 D) | ○ | ○ | 2.8 ppm |
| Comparative Example 2 | steel | 3 | 20 | Zn—Ni | 12 (4 D) | X | ○ | 0.5 ppm |
| Comparative Example 3 | steel | 8 | 5 | Sn—Zn | 4 (0.5 D) | ○ | X | less than 0.1 ppm |
| Comparative Example 4 | steel | 5 | 5 | — | absence of Zn-plated layer | ○ | X | — |
| Comparative Example 5 | SUS304 | 5 | — | — | — | ○ | X | — |

*1: Confirmation of presence/absence of cracking or delaminating of plated film on inner surface of pipe when bending test was performed according to JASO-M-101
*2: Determination according to Zn ion concentration measurement in test liquid after corrosion test according to ICP
○ = excellent
X = poor Ni-plated layer at an end on a side of gasoline inflow in the fuel conveying pipe, the anti-rust film layer having a thickness in a range of 0.1 to 8 μm, and when an inner diameter of the fuel conveying pipe is D mm, the anti-rust film layer being provided only up to a position of D to 6D mm from the end of the fuel conveying pipe inward, and at least a portion of the outer circumferential surface of the fuel conveying pipe being covered with a Zn-plated layer or a Zn-based alloy-plated layer.

3. A steel fuel conveying pipe for conveying gasoline, the pipe having opposite inner and outer circumferential surfaces and opposite ends, the pipe further comprising:

a Ni-plated layer with a thickness of 1 to 15 μm provided on all of the inner circumferential surface of the fuel conveying pipe, an anti-rust film layer consisting essentially of a Zn-plated layer or a Zn-based alloy-plated layer provided on the Ni-plated layer at both ends on sides of gasoline inflow and gasoline outflow in the fuel conveying pipe, the anti-rust film layer having a thickness in a range of 0.1 to 8 μm, and when an inner diameter of the fuel conveying pipe is D mm, the anti-rust film layer being provided only up to a position of D to 6D mm from the end of the fuel conveying pipe inward, and at least a portion of the outer circumferential surface of the fuel conveying pipe being covered with a Zn-plated layer or a Zn-based alloy-plated layer.

4. The steel fuel conveying pipe of claim 1, wherein the fuel conveying pipe is a bypass pipe which couples direct-injection rails with each other in a V-type gasoline engine.

5. The steel fuel conveying pipe of claim 2, wherein the fuel conveying pipe is a bypass pipe which couples direct-injection rails with each other in a V-type gasoline engine.

6. The steel fuel conveying pipe of claim 3, wherein the fuel conveying pipe is a bypass pipe which couples direct-injection rails with each other in a V-type gasoline engine.

7. The steel fuel conveying pipe of claim 1, wherein the Zn-plated layer or the Zn-based alloy-plated layer is not provided on the Ni-plated layer at positions more than 6D mm from either of the ends of the fuel conveying pipe.

8. The steel fuel conveying pipe of claim 2, wherein the Zn-plated layer or the Zn-based alloy-plated layer is not provided on the Ni-plated layer at positions more than 6D mm from the inflow ends of the fuel conveying pipe to the end of the fuel conveying pipe opposite the inflow end.

9. The steel fuel conveying pipe of claim 3, wherein the Zn-plated layer or the Zn-based alloy-plated layer is not provided on the Ni-plated layer at positions more than 6D mm from either of the ends of the fuel conveying pipe.

* * * * *